(12) United States Patent
Reuter et al.

(10) Patent No.: US 10,396,531 B2
(45) Date of Patent: Aug. 27, 2019

(54) FRAME PROFILE FOR A FRAME RACK OF A SWITCH CABINET, AND A CORRESPONDING FRAME RACK

(71) Applicant: RITTAL GMBH & CO. KG, Herborn (DE)

(72) Inventors: Wolfgang Reuter, Liebenscheid (DE); Daniel Brück, Sinn (DE); Timo Schindler, Gladenbach (DE); Hartmut Paul, Breitscheid (DE); Heiko Holighaus, Eschenburg (DE)

(73) Assignee: Rittal GmbH & Co. KG (DE)

( * ) Notice: Subject to any disclaimer, the term of this patent is extended or adjusted under 35 U.S.C. 154(b) by 0 days.

(21) Appl. No.: 15/780,978

(22) PCT Filed: Sep. 21, 2016

(86) PCT No.: PCT/DE2016/100440
§ 371 (c)(1),
(2) Date: Jun. 1, 2018

(87) PCT Pub. No.: WO2017/092726
PCT Pub. Date: Jun. 8, 2017

(65) Prior Publication Data
US 2018/0375302 A1    Dec. 27, 2018

(30) Foreign Application Priority Data
Dec. 4, 2015    (DE) .................. 10 2015 121 192

(51) Int. Cl.
*H02B 1/01* (2006.01)
*A47B 47/00* (2006.01)

(52) U.S. Cl.
CPC ............. *H02B 1/014* (2013.01); *H02B 1/013* (2013.01); *A47B 47/005* (2013.01); *A47B 47/0016* (2013.01)

(58) Field of Classification Search
CPC .... H02B 1/014; H02B 1/013; A47B 47/0016; A47B 47/005
See application file for complete search history.

(56) References Cited

U.S. PATENT DOCUMENTS

| 5,791,115 A * | 8/1998 | Nicolai | H02B 1/01 |
|---|---|---|---|
| | | | 52/836 |
| 6,238,027 B1 * | 5/2001 | Kohler | E05D 5/023 |
| | | | 312/265.1 |

(Continued)

FOREIGN PATENT DOCUMENTS

| DE | 19544432 A1 * | 6/1997 | ............... H02B 1/01 |
|---|---|---|---|
| DE | 19737668 A1 * | 7/1998 | ............... H02B 1/01 |

(Continued)

OTHER PUBLICATIONS

International Search Report and Written Opinion issued in PCT/DE2016/100440, dated Jan. 25, 2017; ISA/EP.

*Primary Examiner* — Hanh V Tran
(74) *Attorney, Agent, or Firm* — Harness, Dickey & Pierce, PLC (57) ABSTRACT

The invention relates to a frame profile for a frame rack of a switch cabinet, wherein the frame profile has: a first and a second profile web, wherein a free end of the first profile web has a first sealing edge, and a free end of the second profile web has a second sealing edge, a first mounting side with fixing receptacles, which first mounting side is spaced apart from the first sealing edge by a first dimension of a first connecting side of the first profile web, which connects the first mounting side to the first sealing edge, a second mounting side with fixing receptacles, which second mounting side is spaced apart from the second sealing edge by a second dimension of a second connecting side of the second profile web, which connects the second mounting side to the (Continued)

second sealing edge, characterized in that at least one of the profile webs has an undercut.

14 Claims, 11 Drawing Sheets

(56) References Cited

U.S. PATENT DOCUMENTS

| | | | | |
|---|---|---|---|---|
| 6,238,028 B1* | 5/2001 | Benner | ............ | H02B 1/32 211/192 |
| 6,965,075 B2* | 11/2005 | Suzuki | ............ | H02B 1/01 174/50 |
| 9,871,353 B2 | 1/2018 | Boehme et al. | | |
| 2001/0050516 A1* | 12/2001 | Minoura | ............ | H02B 1/308 312/223.1 |
| 2002/0166831 A1* | 11/2002 | Klassen | ............ | E05D 5/023 211/183 |
| 2005/0174020 A1* | 8/2005 | Francisquini | ............ | H02B 1/01 312/265.3 |
| 2007/0175648 A1* | 8/2007 | Francisquini | ............ | H02B 1/01 174/50 |
| 2016/0352079 A1 | 12/2016 | Paul | | |
| 2016/0352080 A1* | 12/2016 | Brueck | ............ | H02B 1/013 |
| 2016/0352083 A1* | 12/2016 | Brueck | ............ | H02B 1/308 |
| 2016/0363150 A1 | 12/2016 | Schindler | | |

FOREIGN PATENT DOCUMENTS

| | | | |
|---|---|---|---|
| DE | 10154706 A1 | 5/2003 | |
| DE | 10207364 B4 | 6/2007 | |
| DE | 102006003771 A1 | 8/2007 | |
| DE | 102011052163 B3 | 12/2012 | |
| DE | 102014101404 A1 | 8/2015 | |
| EP | 1770838 A1 | 4/2007 | |
| WO | WO-9823009 A1 * | 5/1998 | ............ H02B 1/28 |

* cited by examiner

Fig. 11b

FRAME PROFILE FOR A FRAME RACK OF A SWITCH CABINET, AND A CORRESPONDING FRAME RACK

CROSS-REFERENCE TO RELATED APPLICATIONS

This application is a 371 U.S. National Stage of International Application No. PCT/DE2016/100440, filed on Sep. 21, 2016, which claims priority to German Application 10 2015 121 192.0, filed on Dec. 4, 2015. The entire disclosures of the above applications are incorporated herein by reference.

FIELD

The invention is based on a frame profile for a frame rack of a switch cabinet, wherein the frame profile has:

a first and a second profile web, wherein a free end of the first profile web has a first sealing edge, and a free end of the second profile web has a second sealing edge, a first mounting side with fixing receptacles, which first mounting side is spaced apart from the first sealing edge by a first dimension of a first connecting side of the first profile web, which connects the first mounting side to the first sealing edge, a second mounting side with fixing receptacles, which second mounting side is spaced apart from the second sealing edge by a second dimension of a second connecting side of the second profile web, which connects the second mounting side to the second sealing edge.

Such a frame profile is known from DE 10 2014 101 404 A1. Another frame profile in which, however, instead of profile webs with sealing edges, sealing sides extending parallel to the sealing plane are formed, is known from US 2001/0050516 A1.

BACKGROUND

This section provides background information related to the present disclosure which is not necessarily prior art.

In the construction of a frame profile for a frame rack of a switch cabinet, it must be ensured that the frame profile geometry, on the one hand, allows the cost effective manufacturing of the frame profile and, on the other hand, it is ensured that the frame profile has the largest possible functional scope when it is used in the construction of switch cabinets. It has been found that the frame profile known from DE 10 2014 101 404 A1 is in need of improvement in the series arrangement of switch cabinets, in the mounting of accessories and in the mounting of flat portions.

SUMMARY

This section provides a general summary of the disclosure, and is not a comprehensive disclosure of its full scope or all of its features.

Therefore, the aim of the invention is to develop the known frame profiles in such a manner that, while keeping a simple base construction using as few bent edges as possible, it has an expanded functional scope, in particular with regard to the series arrangement capability, the mounting of accessories and flat portions.

Accordingly, it is provided that at least one of the profile webs has an undercut. This undercut can be used, for example, so that a fit-on seal can be fit via a groove, which also has an undercut design, onto the undercut profile web and secured there. In comparison to the frame profile geometries known from the prior art, a better hold of a fit-on seal is thus achieved.

An undercut contour formed by the undercut profile web can moreover serve for securing a mounting element for the fixing of an accessory in the interior space of the switch cabinet, for the purpose of which the mounting element is accommodated, for example, in a positive-locking manner in the undercut contour and is optionally secured. The undercut contour can also serve as a rain gutter for conveying fluid away from the sealing edge, in particular if the frame profile forms a horizontal profile of the frame rack of a switch cabinet. The undercut contour of a horizontal profile can moreover be a receptacle of a holder for flat portions of a switch cabinet. Not least, the undercut contour can be used for positioning purposes, for example, in order to arrange, in the series arrangement of switch cabinets, the (vertical) profiles of mutually adjoining frame racks at a defined spacing from one another.

In particular, the frame profile can have a closed profile geometry in cross section. However, the profile geometry can also be open, wherein, in that case, it can also be provided that a profile side of the open frame profile in cross section is closed by a profile side of an additional profile. Such a concept is known from the German patent application DE 10 2015 121 192.0 A1 which was filed on the same day.

For the formation of the undercut, it can be provided that, on the sealing edge, the connecting side of the profile web having the undercut transitions via a folded edge of more than 180° into an additional profile side of the profile web having the undercut. The folded edge can be continuous, so that the sealing edge has a substantially spherical sealing contour.

Moreover, the connecting side of the profile web having the undercut can extend at an acute angle, where α>0°, with respect to an additional profile side of the profile web having the undercut. Here, the angle α can open towards the sealing edge. The acute angle α can be between 1° and 10° and is preferably approximately 5°.

The connecting side of the profile web having the undercut and the additional profile side of the profile web having the undercut can converge up to a minimum spacing where α>0 cm. A cavity can be formed between the connecting side and the additional connecting side. The cavity in turn can be accessible via an opening at a site where the connecting side and the additional profile side converge up to the minimum spacing. Moreover, the cavity can be accessible via passages extending through the connecting side.

The additional profile side of the profile web having the undercut can transition at a site of a maximum convergence on the connecting side via a bent angle at an obtuse angle into a straight web connecting side which connects the two profile webs to one another via the additional profile sides thereof.

The connecting side of the profile web having the undercut can transition via a 90° bent edge into the mounting side which is spaced apart by the dimension from the sealing edge of the profile web.

The mounting sides can extend at an angle of 90° with respect to one another, wherein, in each case, at a site of maximum convergence towards one another, they transition via another bent edge into the respective associated connecting side.

Here, the mounting sides can be profile sides of a base body which is rectangular in cross section, wherein the frame profile, in a cross-sectional plane perpendicular to the longitudinal axis thereof, is mirror symmetrical with respect to a symmetry axis extending through an imaginary intersection of the two mounting sides and an edge of the base body, which is located diametrically opposite this intersection and on which two additional profile sides of the base body, which extend perpendicularly to one another, transition into one another. In the cross-sectional plane, the bent edges can have an additional minimum spacing perpendicularly to the symmetry axis, where b>0 cm.

Between the sealing edge and a site of maximum convergence towards the additional profile side, the connecting side of the profile web having the undercut can have a plurality of passages arranged at a grid spacing and extending through the connecting side.

The frame profile can be a horizontal profile of a frame rack of a switch cabinet, wherein the connecting side of the profile web having the undercut extends horizontally, and, above it, the additional profile side extends at an acute angle with respect to the horizontal and sloping from the sealing edge in the course of the profile web. If the frame profile here is an upper horizontal profile of a frame rack, a holder for flat portions, which is secured on a flat portion on the upper end thereof, can be placed on the additional profile side. Here, either a fit-on seal can be fitted via the sealing edge onto the profile web having the undercut, which fit-on seal is applied with a sealing surface against an inner side of a flat portion, which faces the horizontal profile, or a sealing element can be arranged on the inner side of the flat portion, which sealing element is applied against the sealing edge. As a result, it is achieved that the fit-on seal or the sealing element is compressed by a downward force, to which the holder with the flat portion fixed thereto is exposed on the additional profile side.

Moreover, it is conceivable that the additional profile side is a profile side which is closed over its entire surface and which, with a straight web connecting side into which it transitions via a bent edge at an obtuse angle, forms a rain gutter.

The above-described frame rack is particularly suitable for the formation of a cuboid frame rack of a switch cabinet with four vertical and eight horizontal struts, wherein, in the eight corners of the frame rack, in each case three frame profiles are arranged at right angles with respect to one another. The frame profiles can be arranged at right angles with respect to one another and be connected to one another using corner connectors. In particular, it is possible to provide that all twelve profile struts of the frame rack have an identical cross-sectional geometry, so that only one profile type is needed for the formation of the frame rack. In particular, it can be provided that, on the six sides of the frame rack, sealing edges of four frame profiles adjoining one another at right angles form a rectangular, peripherally closed sealing edge which forms an outer edge of the respective side of the frame rack.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Additional details of the invention are explained in reference to the following figures which show exemplary embodiments. Here.

DETAILED DESCRIPTION

Example embodiments will now be described more fully with reference to the accompanying drawings.

Figure 1:
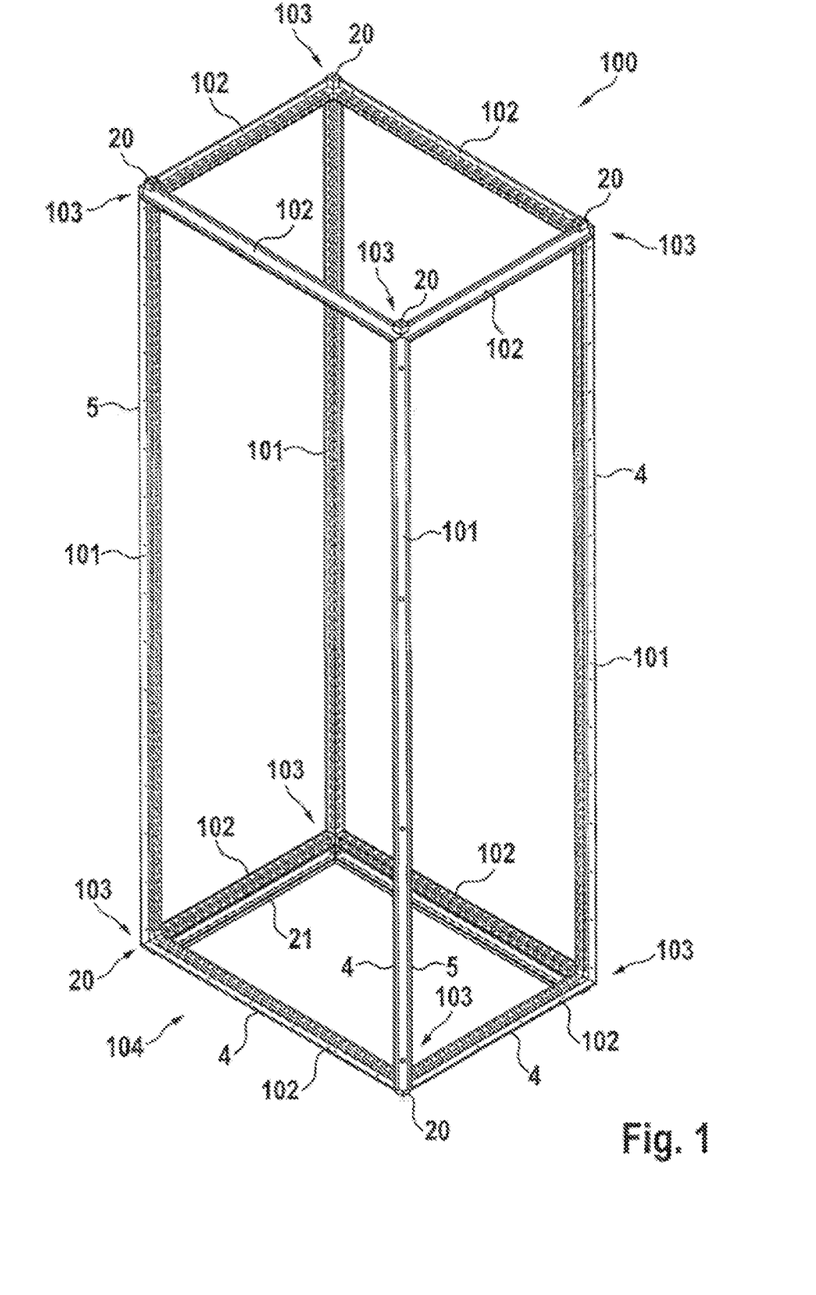
FIG. 1 shows a frame rack of a switch cabinet, in a perspective representation.

FIG. 1 shows a frame rack 100 which is constructed from four vertical struts 101 and eight horizontal struts 102, which are formed as identical frame profiles, wherein, in the corners 103 of the cubic frame rack 100, in each case three frame profiles 101, 102, which are oriented perpendicularly with respect to one another, are arranged with respect to one another and connected to one another via a corner connector 20. It can be seen that, in the corner area 103, the sealing edges 4, 5 of the frame profiles 1 of the frame rack 100 or the associated profile webs are arranged with respect to each other adjoining one another, so that, on a respective side of the frame rack 100, a peripherally closed sealing edge is formed, which, precisely on the corresponding side of the frame rack 100, forms an outer edge of the frame rack 100, via which the frame rack 100 can be applied, for example, sealingly, against a flat portion or the like and optionally with the use of a sealing element. The sealing edges which abut against one another at right angles can be connected, for example, welded, to one another in the corner area. They can also be connected to one another via an additional sealing surface or sealing edge of a corner piece, so as to form a peripherally closed sealing edge or sealing surface.

The four lower horizontal profiles 102 form a bottom frame or a bottom unit 104 of the frame rack 100, wherein the bottom unit 104 is placed on an additional frame 21 and optionally connected thereto. Via the additional frame 21, in the bottom area of the frame rack 100, an additional function is made available, here an additional mounting plane along the inner periphery of the bottom unit 21, for example, for fixing a bottom tray.

Figure 2:
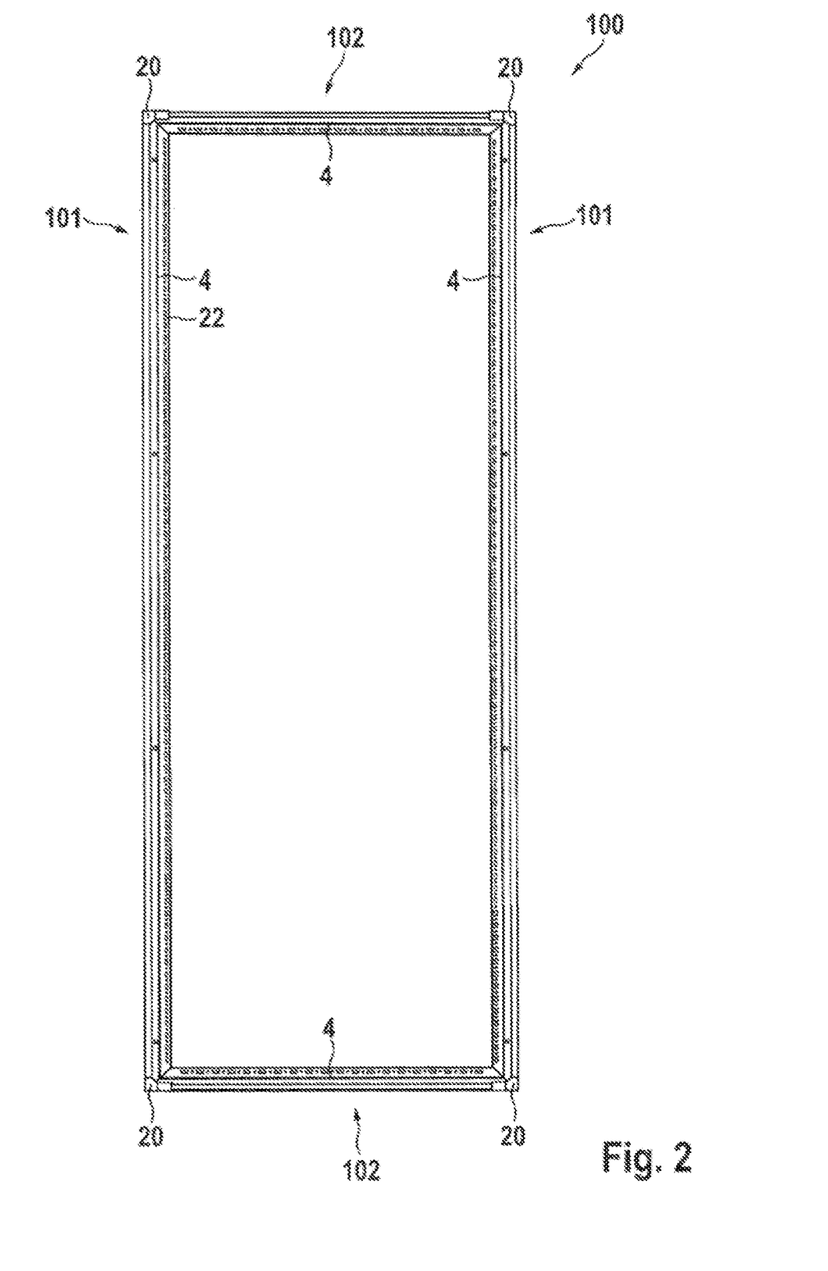
FIG. 2 shows a side view of the frame rack according to FIG. 1.

FIG. 2 shows a side view of the frame rack 100 according to FIG. 1, wherein a side surface of the frame rack 100 is assembled from two vertical struts 101 and two horizontal struts 102 arranged perpendicularly thereto. Again, one can see that the sealing edge 4 of the horizontal and the vertical struts is formed so that it is peripherally closed and thus can form a reliable seal with respect to a lateral flat portion or the like. In a direction perpendicular to the plane of the drawing, set back with respect to the sealing edge 4, a mounting side 22 is provided with mounting openings, whereby the mounting of switch cabinet fittings from the outside of the switch cabinet is made possible. This concept is described in further detail in DE 10 2014 101 404 A1.

Figure 3A:
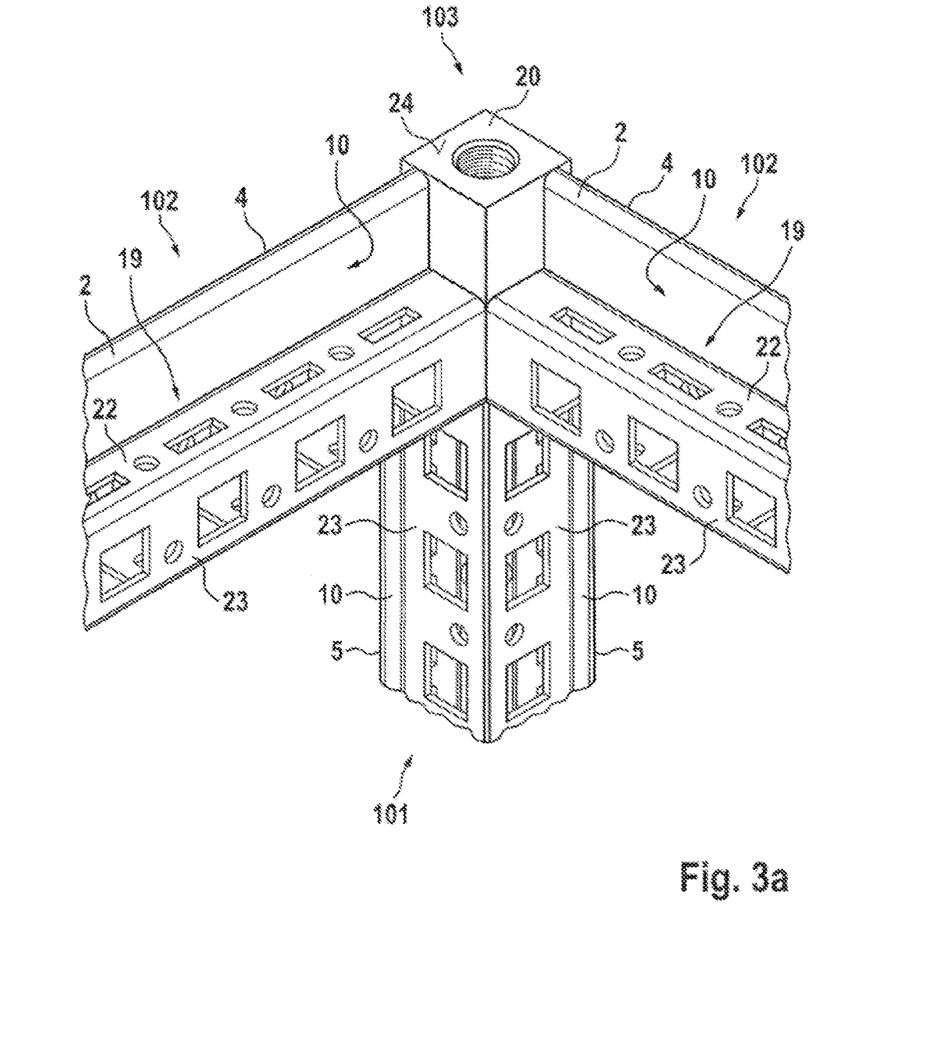
FIG. 3a shows a detail view of an upper edge of the frame rack according to FIG. 1, in a perspective representation and viewed from the inner side of the frame rack.

FIG. 3a shows a perspective view of an upper corner area of the frame rack 100 according to FIG. 1. Here, two horizontal struts 102 and a vertical strut 101 meet one another at right angles and are oriented perpendicularly with respect to one another and connected to one another via a corner piece 20. Moreover, one can see that on the upper side of the frame rack 100, and not on the vertical side surface of the frame rack 100, as shown in contrast in FIG. 2, the sealing edges 4 of the horizontal profile 102 do not transition directly into one another, but are connected instead to one another via a sealing surface 24. For this purpose, the sealing surface 24 is aligned precisely with the sealing edges 4. Offset in vertical direction downward with respect to the sealing edges 4, in each case, a mounting side 22 with a system perforation is formed, in order to form in this manner a mounting plane which set back with respect to the sealing edge 4. Folded at right angle from this mounting side 22, an additional mounting side 23 with an additional system perforation is formed. The additional mounting sides 23 of the horizontal profiles 102 adjoin one another at a right angle. In the connecting side 10 of the profile webs 2, regularly spaced passages 19 can be arranged, in order to form a counting aid. The additional mounting sides 23 of the vertical profile 101 are also arranged in such a manner that they extend spaced apart parallel with respect to the connecting sides 10 of the sealing webs 2, in order to thus form a mounting plane offset with respect to the profile sides 10 of the profile webs 2 towards the interior of the switch cabinet.

Figure 3B:
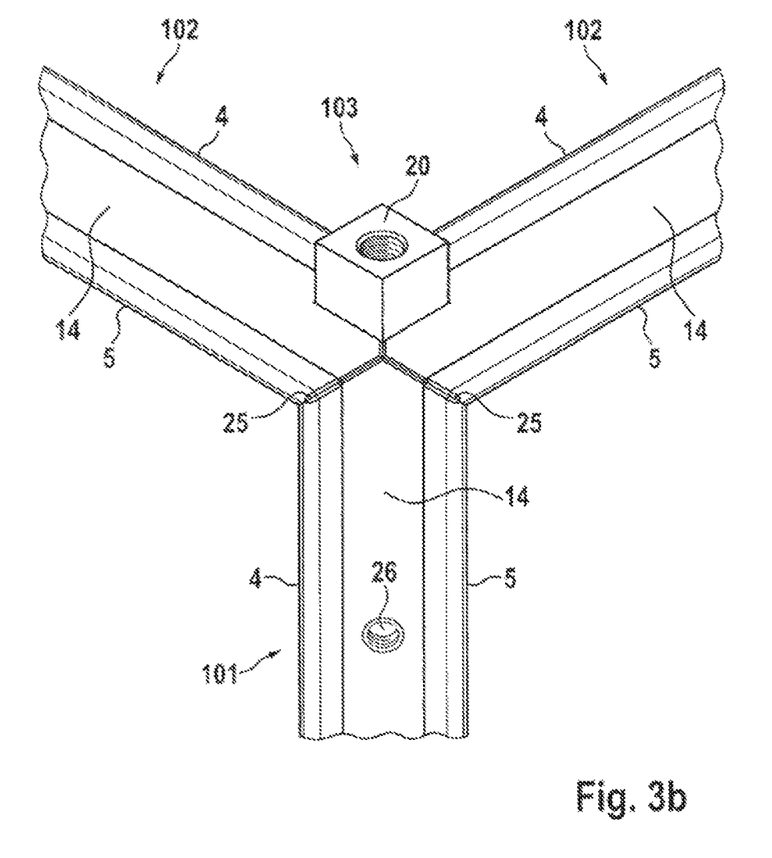
FIG. 3b shows the corner according to FIG. 3a in a perspective representation and viewed from the outer side of the frame rack.

FIG. 3b shows that the profile webs 2 as well as the web connecting sides 14 of the horizontal struts 102 and of the vertical strut 101 are notched in the corner area 103, in order, on the one hand, to enable the corner connector 20 to pass through the web connecting side 14 and, on the other hand, to enable the positive-locking adjoining of the horizontal profiles 102 against the vertical profile 101 with formation of straight welding seams 25. In the web connecting side 14 of the vertical profile 101, a threaded bore 26 for the fixing of accessory parts or of a lifting eye is formed.

Figure 3C:
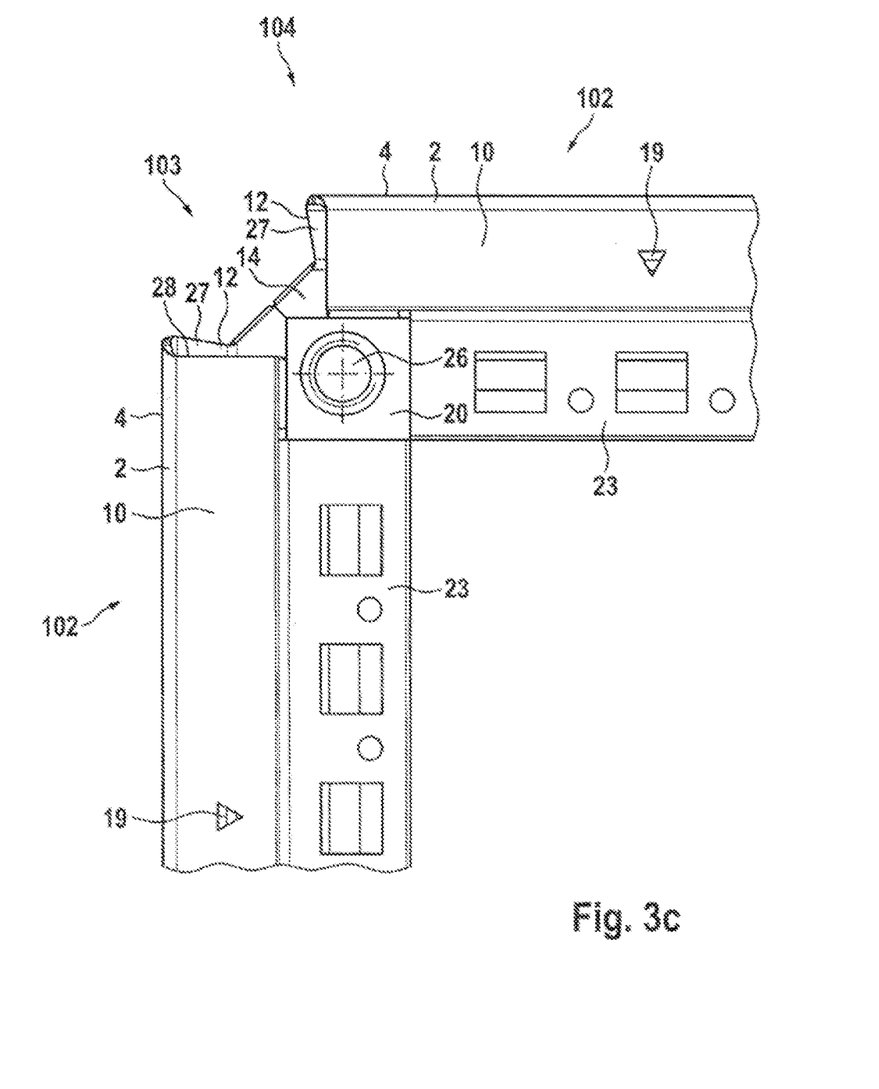
FIG. 3c shows a top view onto the bottom unit of the frame rack according to FIG. 1 with vertical profile removed.

FIG. 3c shows a detail view of the bottom unit 104 of the frame rack 100 according to FIG. 1 in the top view from above. The cover frame formed by the four upper horizontal struts of the frame rack 100 according to FIG. 1 can be designed accordingly in the corner area in the top view from below. In particular, the cover frame and the bottom frame forming the bottom unit 104 can be formed identically and consist of components that are arranged rotated by 180° with respect to one another. For illustration, in the representation according to FIG. 3c, the vertical profile 101 (see FIG. 1) has been removed.

One can see that, in the corner area 103, the ends of the horizontal profiles 102, which end in the corner area 103, are notched in such a manner that, in the top view represented, the additional profile side 12 of the profile web 2 has a protrusion 27, by which it protrudes from the free edge 28 of the second connecting side 10 of the profile web 2. Thereby, the protrusion 27 forms a contact surface for the vertical profile (not represented), when said profile is inserted from above into the corner. Thereby, the orientation of the vertical profile with respect to the horizontal struts 102 forming the bottom unit 104 is facilitated. In the corner connector 20, a threaded bore 26 is formed, for example, for the mounting of the bottom unit 104 on a switch cabinet base.

Figure 4:
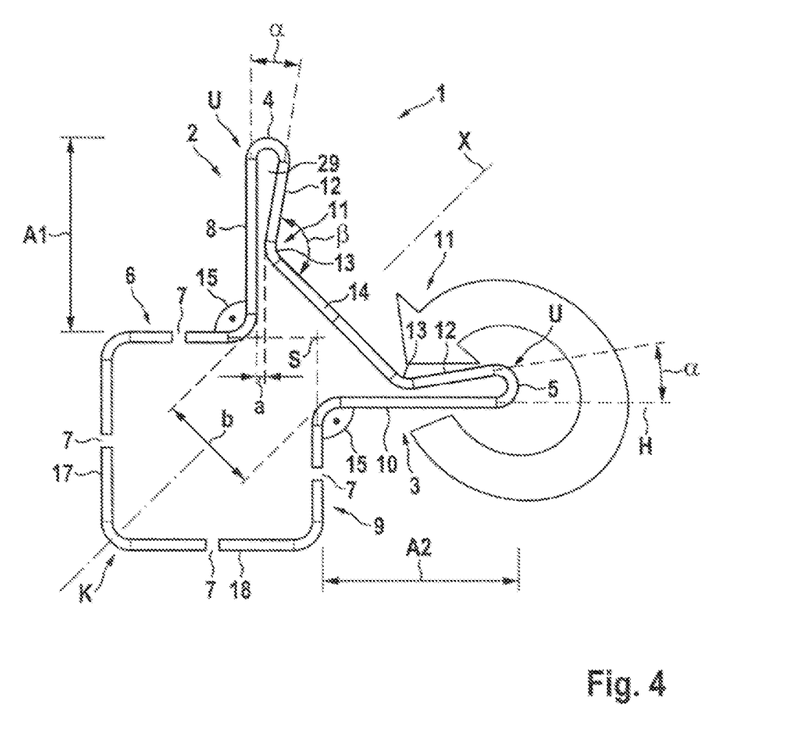
FIG. 4 shows an embodiment of a frame profile in cross section perpendicularly to the longitudinal direction.

In FIG. 4, an embodiment of a frame profile 1 is represented in cross-sectional direction perpendicularly to the longitudinal direction of the profile 1. In comparison to the profile known from DE 10 2014 101 404 A1, the profile 1 is characterized in that the profile webs 2, 3 are formed in each case with an undercut 11, whereby, by means of a relatively simple measure, the frame profile 1 is provided with substantial added value from a functional standpoint. The undercut 11 is formed in that the profile 1, on the profile webs 2, 3 thereof, in each case has a connecting side 8, 10 and an additional profile side 12 extending at an acute angle α thereto, which sides transition into one another via a folded edge U of more than 180°, namely precisely 180°+a. Moreover, one can see that the connecting sides 8, 10 extending perpendicularly with respect to one another and the respective associated additional profile side 12 converge towards one another up to a minimum spacing a, wherein, once the minimum spacing a has been reached, the respective additional profile side 12 is folded into the web connecting side 14 away from the connecting side 8, 10. The acute angle α can be between 1° and 10° and is preferably approximately 5°.

The profile webs 2, 3 thus enclose, in each case, between the connecting side 8, 10 thereof and the additional profile side 12 thereof, a cavity 29 which tapers from the sealing edge 4, 5 in the further course of the connecting sides 8, 10 and of the additional profile side 12, and which is accessible via an access at the site of maximum convergence between the connecting sides 8, 10 and the additional profile side 12. At this site, precisely the web connecting side 14 also transitions at an obtuse angle β into the respective additional profile side 12. The first connecting side 8 transitions via a right angle 15 into the mounting side 6, and the second connecting side 10 transitions via an another right angle 15 into the second mounting side 9. The mounting sides 6, 9 each have a system perforation consisting of fixing receptacles 7. Again at right angles with respect to the mounting sides 6, 9, additional profile sides 17, 18 with additional fixing receptacles 7 are arranged, wherein the profile sides 17, 18 themselves are arranged perpendicularly with respect to one another. Thus, the profile sides 6 and 18 as well as the profile sides 9 and 17 are arranged parallel to one another.

One can see that the mounting sides 6, 9 are profile sides of a base body which is rectangular in cross section, wherein, in the represented cross-sectional plane, the frame profile 1, perpendicularly to the longitudinal axis thereof, is mirror symmetrical with respect to a symmetry axis X which extends through an imaginary intersection S of the two mounting sides 6, 9 and through an edge K of the base body, which is located diametrically opposite this intersection point S, on the two additional profile sides 17, 18 of the base body, which transition into one another. The bent edges 16 have, perpendicularly to their symmetry axis X, an additional minimum spacing b, where b>0 cm.

The mounting sides 6, 9 are spaced by dimensions A1, A2 from the respective sealing edges 4, 5, forming in this manner a mounting plane which is offset with respect to the sealing edges.

The frame profile 1 is designed as a closed frame profile. However, it is conceivable that the frame profile 1 has an open cross-sectional geometry. For this purpose, for example, it is conceivable that at least one of the two profile sides 17, 18 is removed at least partially, in order thus to enable access to the profile interior from the inner side of the switch cabinet.

Figure 5:
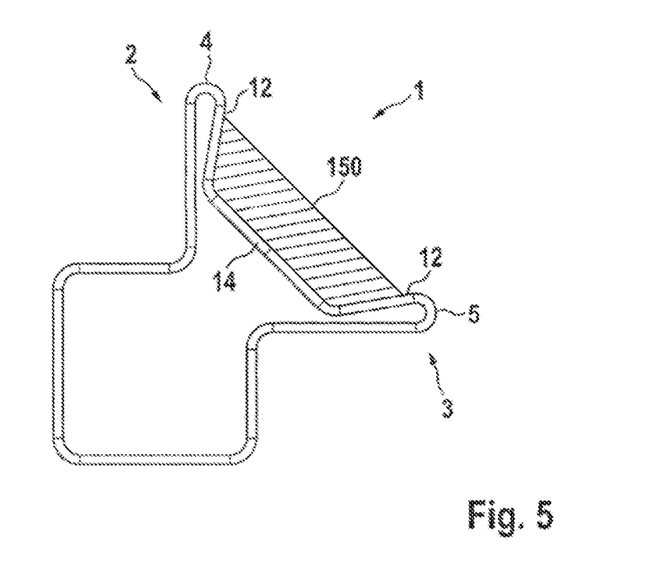
FIG. 5 shows a first application example of the frame profile according to FIG. 4.

FIG. 5 shows a form of application of the frame profile geometry shown in FIG. 4. As can be seen, a fixing wedge 150 is inserted into a recess formed by the additional profile side 12 and the web connecting side 14. The fixing wedge 150 can be used, for example, to fix an accessory part from outside to the profile of the frame rack of the switch cabinet. When the frame profile is an upper horizontal profile, for example, the fixing wedge 150 can be used to hook a flat portion of the switch cabinet from outside into the frame rack. One can see that the fixing wedge 150 does not protrude past an imaginary tangent adjoining the two sealing edges 4, 5 and is thus accommodated completely in the recess formed.

Figure 6:
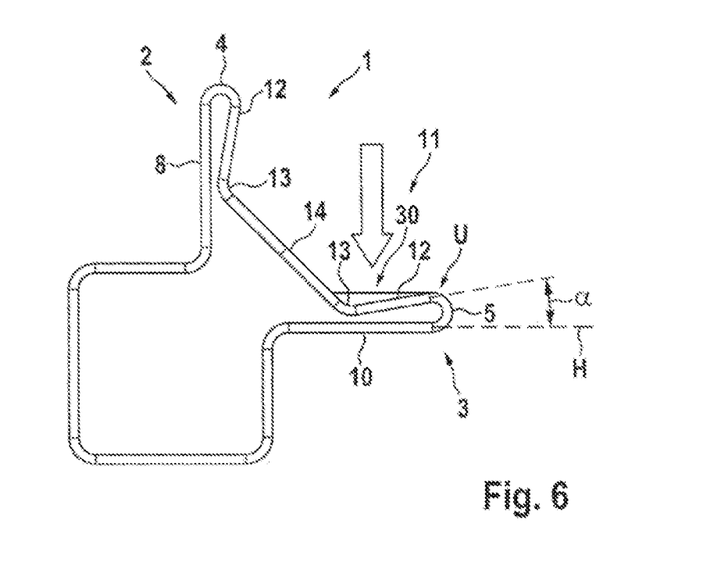
FIG. 6 shows a second application example of the frame profile according to FIG. 4.

In FIG. 6, an additional functionality of the frame profile according to FIG. 2 is illustrated, when said frame profile is used as horizontal profile of a frame rack for a switch cabinet. When the frame profile is a horizontal profile, the second connecting side 10 extends precisely horizontally, and the additional profile side 12 of the profile web extends at an acute angle α with respect to the horizontal H, wherein the additional profile side 12 extends sloping with increasing spacing from the second sealing edge 5 and approaching the second connecting side 10, until it transitions at a bent edge 13, where it assumes a local low point, into the rising web connecting side 14 via a bent edge. In this manner, a rain gutter 30 is formed by the web connecting side 14 bent in opposite direction with respect to the horizontal H and the additional profile side 12, as a result of which it is achieved that water accumulating on the sealing edge 5 is led away from the sealing edge 5 in the direction of the bent edge 13, so that the sealing edge 5 is not exposed to water.

Figure 7:
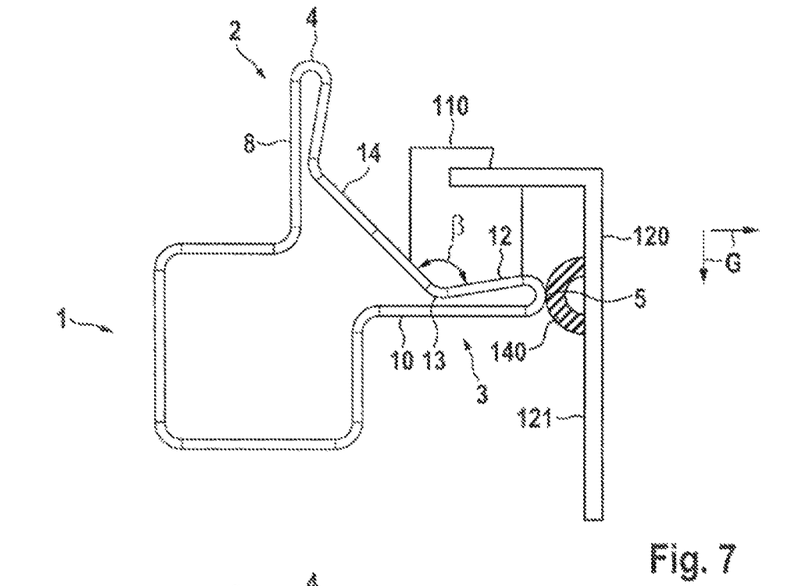
FIG. 7 shows a third application example of the frame profile according to FIG. 4.

In FIG. 7, it is illustrated how a flat portion 120 can be introduced by means of a holder 110 into the recess formed between the additional profile side 12 and the web connecting side 14. On the inner side 121 of the flat portion 120, a sealing element 140 is arranged, which is applied against the sealing edge 5. Due to the loading of the holder 110 by the flat portion in the direction of the gravitational force G, the holder 110 experiences a downward force along the additional profile side 12 in the direction of the bent edge 13, whereby the sealing element 140 is pressed against the sealing edge 5 for the sealing application.

Figure 8:
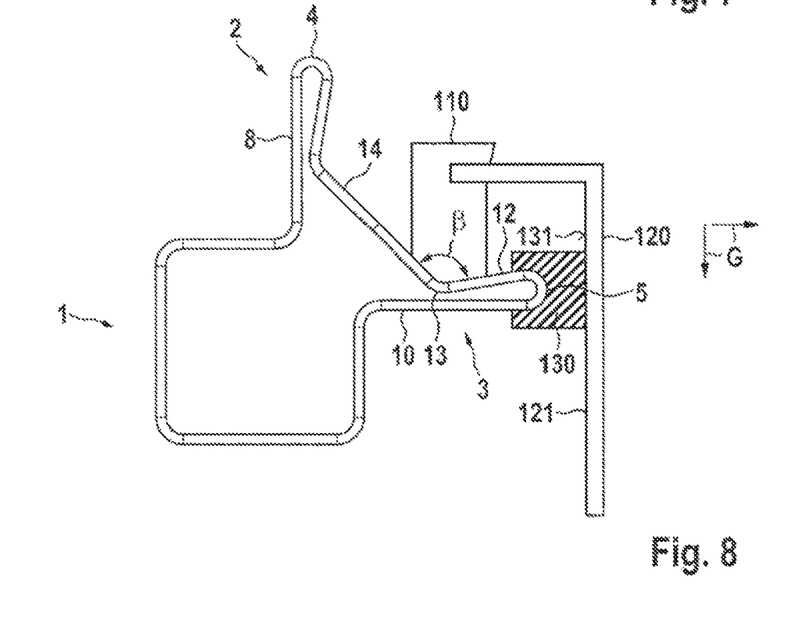
FIG. 8 shows a fourth application example of the frame profile according to FIG. 4.

As shown in FIG. 8, instead of a sealing element 140 (see FIG. 7) arranged on the inner side 121 of the flat portion 120, a fit-on seal 130 can be placed on the undercut profile web 2. Due to the undercut, the fit-on seal 130, in its fitted-on state according to FIG. 8, assumes a frictional connection with the profile web 2. To further promote this, a groove of the fit-on seal 130, by means of which the fit-on seal 130 is slid over the sealing edge 5 of the profile web, can also have an undercut which is a negative reproduction of the undercut of the profile web 2. Here too, analogously to the embodiment in FIG. 7, the holder 110 can be displaced, due to the downward force, on the additional profile side 12 in the direction of the bent edge 13, thus pressing the fit-on seal 130 against the inner side 120 of the flat portion 120 in a sealing manner.

Figure 9:
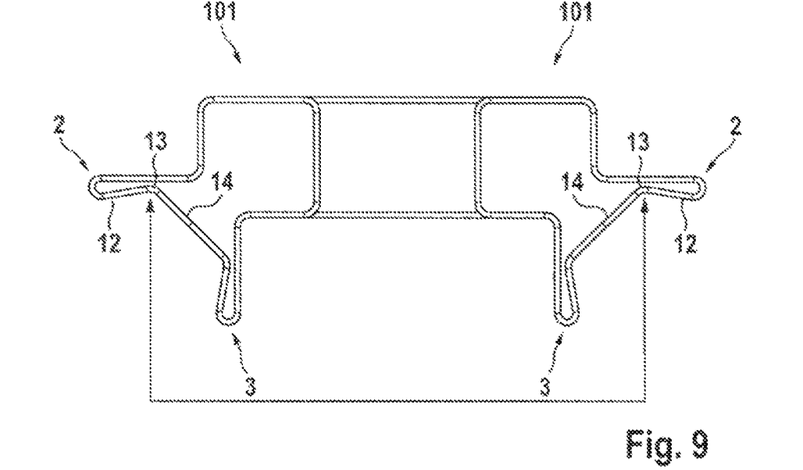
FIG. 9 shows a fifth application example of the frame profile according to FIG. 4.

FIG. 9 illustrates the series arrangement situation of two mutually facing vertical profiles 101 of mutually adjoining frame racks. In the series arrangement, it is essential that, before the mounting of the corresponding series arrangement connector, the frame racks of the two switch cabinets to be connected to one another are at an exactly predetermined horizontal spacing from one another. In this preliminary orientation as well, the resulting local low point on the bent edge 13 between the additional profile side 12 and the web connecting side 14 can be used for arranging the vertical profiles 101 at a certain horizontal spacing from one another.

Figure 10:
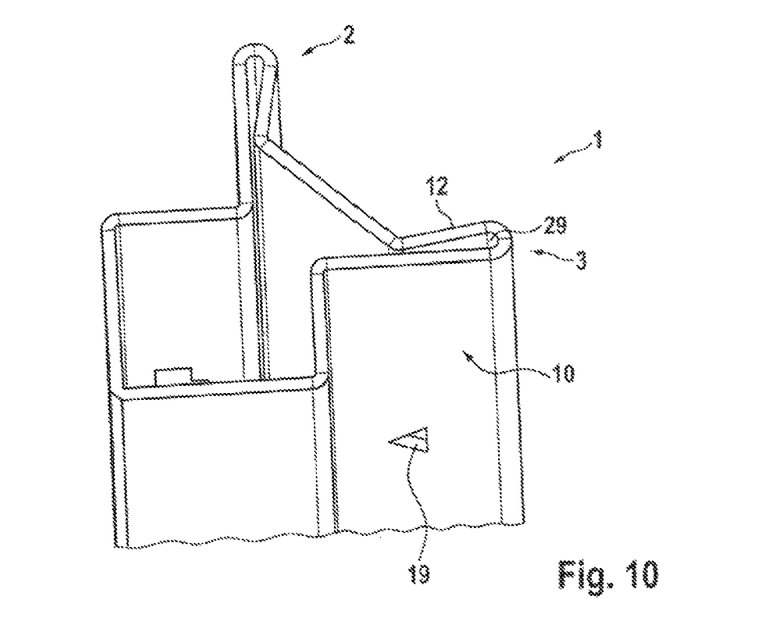
FIG. 10 shows a perspective representation of the frame profile according to FIG. 4.

FIG. 10 shows the frame profile 1 according to FIG. 4 in a perspective representation, wherein, in particular the passage 19 in the second connecting side 10 can be seen, via which the cavity 29 formed between the second connecting side 10 and the additional profile side 12 is accessible. The passage 19 can be used, for example, in order to support the flow of paint from the cavity 29 during dip painting. Moreover, a plurality of regularly spaced passages 19 can be provided in longitudinal direction of the second connecting side 10, so as to form, in addition, a counting perforation.

Figure 11A:
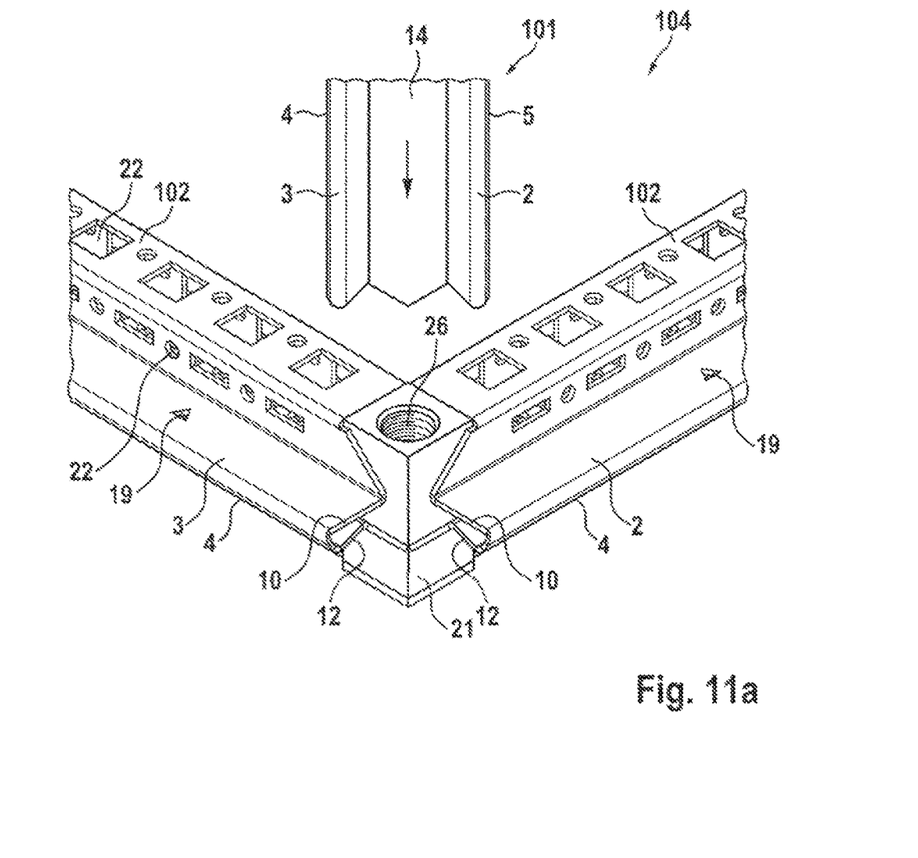
FIGS. 11a and 11b show the mounting process of a vertical profile on a bottom unit for the formation of a frame rack.
Figure 11B:
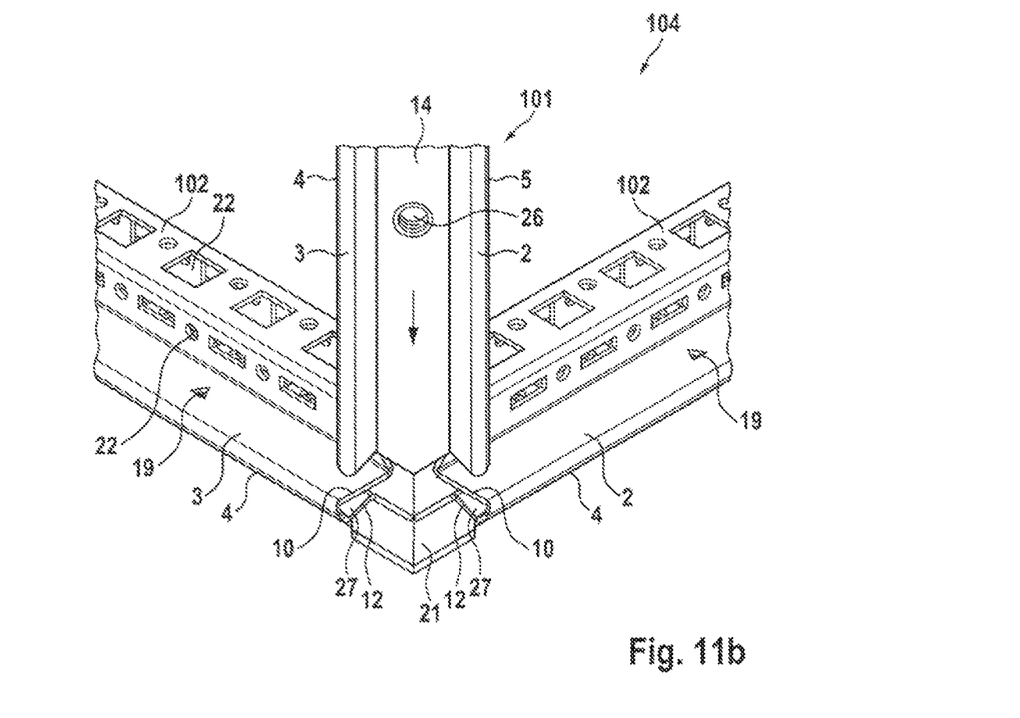

FIGS. 11a and 11b illustrate the mounting of the vertical profile 101 in the corner area of a bottom unit 104 formed by two horizontal profiles 102. As already described in reference to FIG. 3c, the additional profile side 12 can have a protrusion 27 with respect to the second connecting side 10, so as to form a contact surface for the vertical profile 102. The vertical profile 101 and the horizontal profiles 102 can be notched in the corner area so that, in the assembled state, the sealing edges 4, 5 form, on the respective side surfaces of the switch cabinet, peripherally closed sealing edges for the sealing of the frame rack with respect to a flat portion. In particular, it can be provided that the profiles 101, 102 are oriented beforehand relative to one another and connected to one another in the corner area via corner connectors 21.

The features of the invention disclosed in the above description, in the drawing and in the claims can be essential for the implementation of the invention both alone and also in any combination.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A frame profile for a frame rack of a switch cabinet, wherein the frame profile has:
    a first and a second profile web, wherein a free end of the first profile web has a first sealing edge, and a free end of the second profile web has a second sealing edge, wherein at least one of the profile webs has an undercut,
    a first mounting side with fixing receptacles, which first mounting side is spaced apart from the first sealing edge by a first dimension of a first connecting side of the first profile web, which connects the first mounting side to the first sealing edge, a second mounting side with fixing receptacles, which second mounting side is spaced apart from the second sealing edge by a second dimension of a second connecting side of the second profile web, which connects the second mounting side to the second sealing edge, wherein the connecting side of the profile web having the undercut transitions at the sealing edge via a continuous folded edge of more than 180° into an additional profile side of the profile web having the undercut, so that the sealing edge has a spherical sealing contour.

2. The frame profile according to claim 1, in which the connecting side of the profile web having the undercut extends at an acute angle α, where α>0°, towards an additional profile side of the profile web having the undercut.

3. The frame profile according to claim 1, in which the connecting side of the profile web having the undercut at an acute angle α and the additional profile side of the profile web having the undercut converge up to a minimum spacing, where α>0 cm.

4. The frame profile according to claim 3, in which the additional profile side of the profile web having the undercut, at a site of maximum convergence of the connecting side, transitions via a bent edge at an obtuse angle into a straight web connecting side which connects the two profile webs to one another via the additional profile sides thereof.

5. The frame profile according to claim 1, in which the connecting side of the profile web having the undercut transitions via a 90° bent edge into the mounting side spaced apart by the dimension from the sealing edge of the profile web.

6. The frame profile according to claim 1, in which the mounting sides extend at an angle of 90° with respect to one another, wherein they transition in each case at a site of maximum convergence towards one another via an additional bent edge into the respective associated connecting side.

7. The frame profile according to claim 6, in which the mounting sides are profile sides of a base body which is rectangular in cross section, wherein the frame profile, in a cross-sectional plane perpendicular to the longitudinal axis thereof, is mirror symmetrical with respect to a symmetry axis extending through an imaginary intersection of the two mounting sides and an edge of the base body, which is located diametrically opposite this intersection and on which two additional profile sides of the base body, which extend perpendicularly to one another, transition into one another.

8. The frame profile according to claim 7, in which, in the cross-sectional plane, the bent edges have an additional minimum spacing b perpendicularly to the symmetry axis, where b>0 cm.

9. The frame profile according to claim 3, in which, between the sealing edge and a site of maximum convergence on the additional profile side, the connecting side of the profile web having the undercut has a plurality of passages arranged at a grid spacing and extending through the connecting side.

10. The frame profile according to claim 2, in which the frame profile is a horizontal profile of a frame rack of a switch cabinet, wherein the connecting side of the profile web having the undercut extends horizontally, and, above it, the additional profile side extends at an acute angle with respect to the horizontal and sloping from the sealing edge in the course of the profile web.

11. The frame profile according to claim 10, in which the horizontal profile is an upper horizontal profile of the frame rack, wherein a holder for flat portions, which is secured on a flat portion on the upper end thereof, is placed on the additional profile side, and either
   a fit-on seal is fit via the sealing edge onto the profile web having the undercut, which fit-on seal is applied with a sealing surface against an inner side of a flat portion, which faces the horizontal profile, or
   a sealing element is arranged on the inner side of the flat portion, which sealing element is applied against the sealing edge,
   so that the fit-on seal or the sealing element is compressed by a downward force, to which the holder with the flat portion secured thereto is exposed on the additional profile side.

12. The frame profile according to claim 10, in which the additional profile side is a profile side which is closed over its entire surface and which, with a straight connecting side into which it transitions via a bent edge at an obtuse angle, forms a rain gutter.

13. A frame rack for a switch cabinet, which has four vertical profiles and eight horizontal profiles, wherein all twelve profiles are an identical frame profile according to claim 1, of which in each case three of eight corners of the frame rack are connected to one another, oriented perpendicularly with respect to one another.

14. The frame rack according to claim 13, in which, on the six sides of the frame rack, sealing edges of four frame profiles adjoining one another at right angles form a rectangular, peripherally closed sealing edge which forms an outer edge of the respective side of the frame rack.

* * * * *